United States Patent [19]

Naitou

[11] Patent Number: 4,707,792
[45] Date of Patent: Nov. 17, 1987

[54] AUTOMOBILE SPEED CONTROL SYSTEM
[75] Inventor: Yasuo Naitou, Himeji, Japan
[73] Assignee: Mitsubishi Denki Kabushiki Kaisha, Japan
[21] Appl. No.: 784,092
[22] Filed: Oct. 4, 1985
[30] Foreign Application Priority Data Oct. 8, 1984 [JP] Japan .................................. 59-211881

[51] Int. Cl.⁴ ............................................ B60K 31/00
[52] U.S. Cl. ............................... 364/431.07; 123/352; 123/492; 180/176
[58] Field of Search ...................... 364/431.07, 431.06, 364/431.03; 123/436, 492, 352, 360; 180/176

[56] References Cited
U.S. PATENT DOCUMENTS 3,556,245  1/1971  Radin ..................................... 180/176
4,598,370  7/1986  Nakajima et al. .................... 123/352
4,620,519  11/1986 Nagao et al. ......................... 123/492

Primary Examiner—Parshotam S. Lall
Attorney, Agent, or Firm—Leydig, Voit & Mayer

[57] ABSTRACT

An automobile speed control system wherein a speed deviation between a desired speed as set by the driver of the vehicle and the current running speed is corrected by changing the pulse width of a pulse signal applied to a throttle valve of an engine through an actuator for driving the throttle valve. The pulse width is calculated in a control circuit every predetermined time interval by using the speed deviation, the acceleration of the speed, the rate of change of the acceleration, and control parameters as proportional coefficient for the acceleration. The control parameters are selected according to the relationship between the acceleration and the rate of change of the acceleration.

8 Claims, 7 Drawing Figures

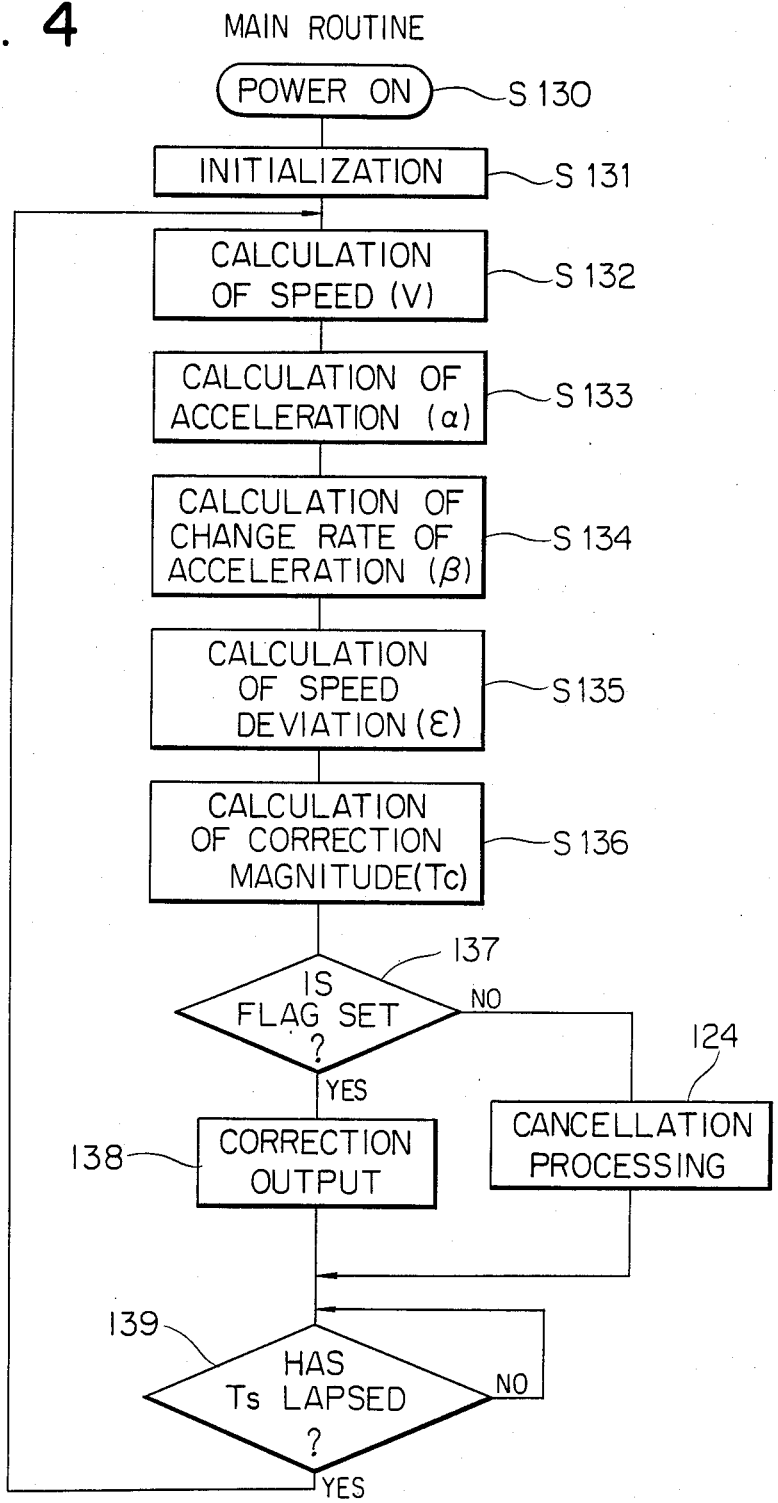

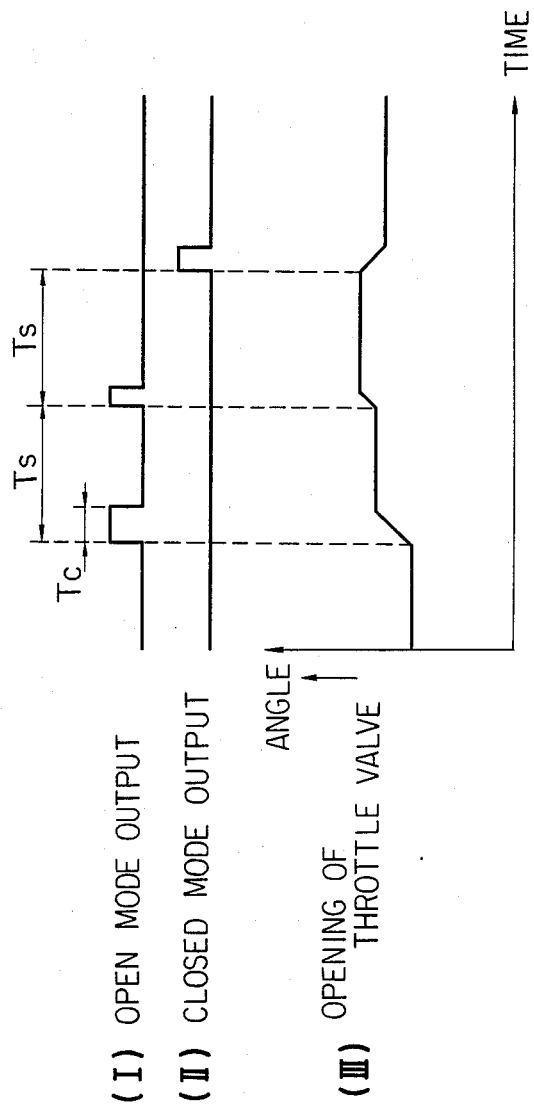

AUTOMOBILE SPEED CONTROL SYSTEM

BACKGROUND OF THE INVENTION

This invention relates to an automobile speed control system, and in particular to an automobile speed control system which automatically serves to hold the running speed of an automobile at a fixed value.

Recently, automobiles or the like have been equipped with a speed control apparatus which automatically controls the automobiles to run at a specific target speed as preset on the speed control apparatus.

For such a speed control apparatus for an automobile, one as disclosed in Japanese Patent Application Laid-open No. 58-98636 has been conventionally used. Generally in this speed control apparatus, a setting operation for a target speed is done in a running state when a constant speed is desired, whereby the automobile is controlled to run at the set speed as its target speed. The actual running speed is compared with the target speed at all times, and the automobile's speed is controlled by the compared result so that when the former is lower than the latter, the output of the engine of the automobile is increased while when the former exceeds the latter, the output of the engine is decreased, thereby causing the former to approach the latter.

However, a disadvantage in such a conventional speed control apparatus for an automobile arises during varying road conditions, for example a road which is alternatively ascending and descending, since the deviation between the target speed and the running speed may become excessively large and a hunting operation may arise due to such a large deviation, resulting in an uncomfortable ride.

On the other hand, the U.S. Pat No. 4,202,424 issued to Sakakibara et al. on May 13, 1980 discloses an automobile speed control system wherein an error signal between the actual and desirable automobile speeds is derived to shift the throttle valve into a position at which both of the speeds are equal to each other while being fed back through an electrical first order lag circuit to a comparator for developing an error signal to stabilize the speed control operation of the system.

SUMMARY OF THE INVENTION

It is accordingly an object of the present invention to provide an automobile speed control system which suppresses the deviation between the actual speed and a target speed while providing a comfortable ride.

For this purpose, a correction magnitude for the output of the engine is adequately determined. More specifically, an automobile speed control system according to the present invention comprises: a running speed measuring means (1) for measuring the running speed of the automobile; a speed setting means (2) for setting a desired speed; a speed deviation calculating means (3) for receiving the set speed signal from the speed setting means and the running speed signal from the speed measuring means to calculate a speed deviation; an acceleration calculating means (4) for calculating the acceleration of the automobile in response to the running speed signal from the speed measuring means; a pulse width calculating means (5) for calculating the pulse width of a pulse signal having a fixed period of time on the basis of the speed deviation signal from the speed deviation calculating means and the acceleration signal from the acceleration calculating means; an actuator (6) for receiving the pulse signal from the pulse width calculating means to control the opening of a throttle valve (7) of an engine according to the pulse width of the pulse signal; an acceleration change rate calculating means (8) for receiving an acceleration signal from the acceleration calculating means to calculate the rate of change of the acceleration of the automobile; and a control parameter adjusting means (9) for receiving the acceleration signal from the acceleration calculating means and the acceleration change rate signal from the acceleration change rate calculating means to adjust the control parameter of the pulse width calculating means.

Preferably, the actuator comprises a diaphram (16) for actuating the throttle valve, and first and second chambers (17,18) partitioned by the diaphram. The first chamber is directly interconnected to the atmosphere, and the second chamber is interconnected to a vacuum source through a vacuum valve (20) and to the atmosphere through an atmosphere valve (21).

The pulse width calculating means may close the vacuum valve when the calculated result of the pulse width is positive whereby the atmosphere valve is opened to move the diaphram to close the throttle valve, and to open the vacuum valve when the calculated result of the pulse width is negative whereby the atmosphere valve is closed to move the diaphram to open the throttle valve.

The control parameter adjusting means may select either one of the calculated pulse widths depending on whether the signs of the acceleration and the acceleration change rate are the same or opposite, the calculated pulse width obtained in the case of the same signs being larger than that obtained in the case of the opposite signs.

The actuator and the throttle valve are held for the sampling time interval except for the time interval of the calculated pulse width.

BRIEF DESCRIPTION OF THE DRAWINGS

The present invention will now be more readily apparent with reference to the embodiment thereof shown in the accompanying drawings in which:

FIGS. 3A-3C and 4 show flow charts for explaining the operation of the automobile speed control system shown in FIGS. 1 and 2; and, FIG. 5 shows a time chart for explaining the operation of the automobile speed control system shown in FIGS. 1 and 2.

Throughout the figures, the same reference numerals indicate identical or corresponding portions.

DETAILED DESCRIPTION OF THE PREFERRED EMBODIMENTS

Figure 1:
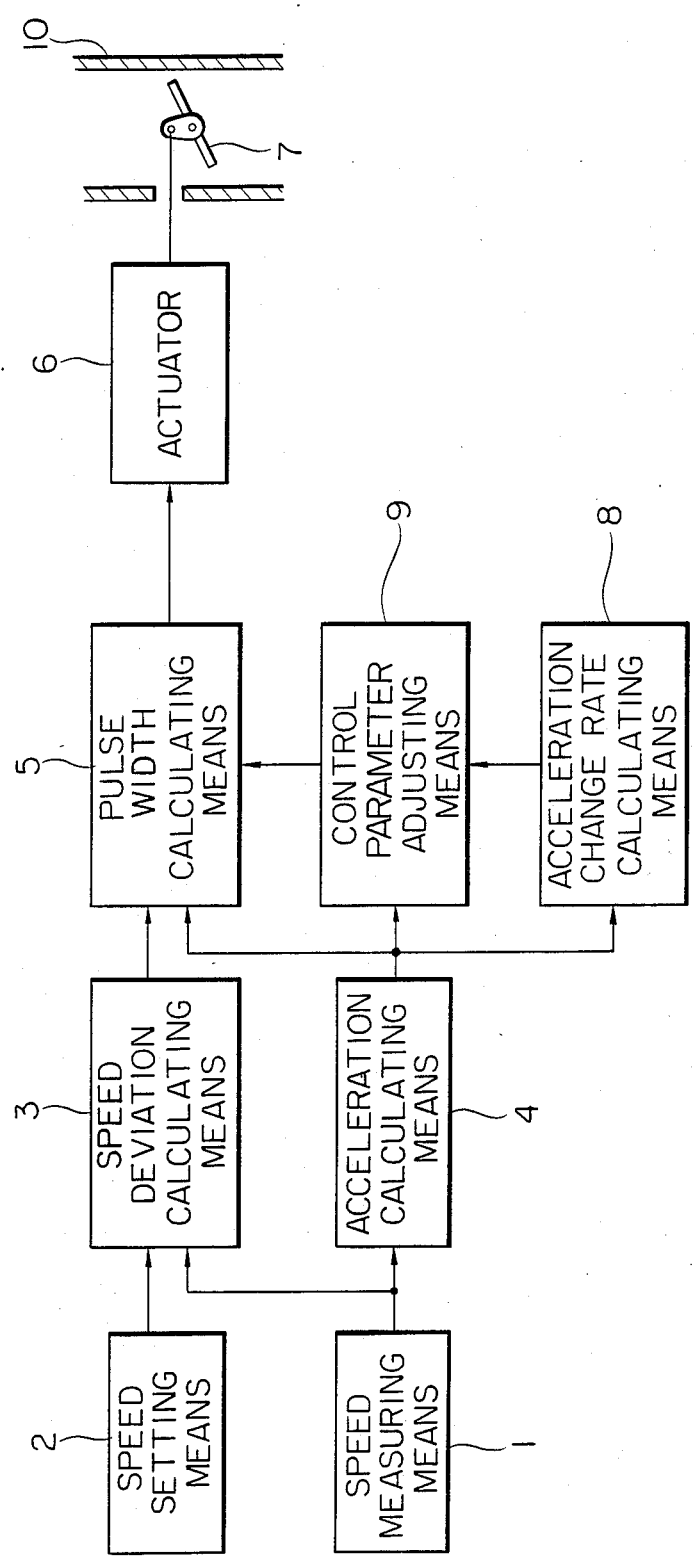
FIG. 1 shows a functional block diagram of an automobile speed control system in accordance with the present invention.

Now, the present invention will be described by referring to embodiments shown in the drawings, particularly in FIG. 1, a running speed measuring means 1 measures the running speed of an automobile and a speed setting means 2 sets a speed desired by a driver. A speed deviation calculating means 3 receives the set speed signal from the speed setting means 2 and the running speed signal from the speed measuring means 1 to calculate a speed deviation or error. An acceleration calculating means 4 calculates the acceleration of the automobile in response to the running speed signal output from the speed measuring means 1. A pulse width calculating means 5 calculates the pulse width of a pulse signal on the basis of the speed deviation signal from the speed deviation calculating means 3 as well as the acceleration signal from the acceleration calculating means 4. An actuator 6 receives the pulse signal from the pulse width calculating means 5 to control the opening of a throttle valve 7 in a carburetor (not shown), which controls the output of the engine (not shown), according to the pulse width of the pulse signal. An acceleration change rate calculating means 8 receives an acceleration signal from the acceleration calculating means 4 to calculate the rate of change of the acceleration of the automobile. A control parameter adjusting means 9 receives the acceleration signal from the acceleration calculating means 4 and the acceleration change rate signal from the acceleration change rate calculating means 8 to adjust a control parameter for the pulse width calculating means 5.

Figure 2:
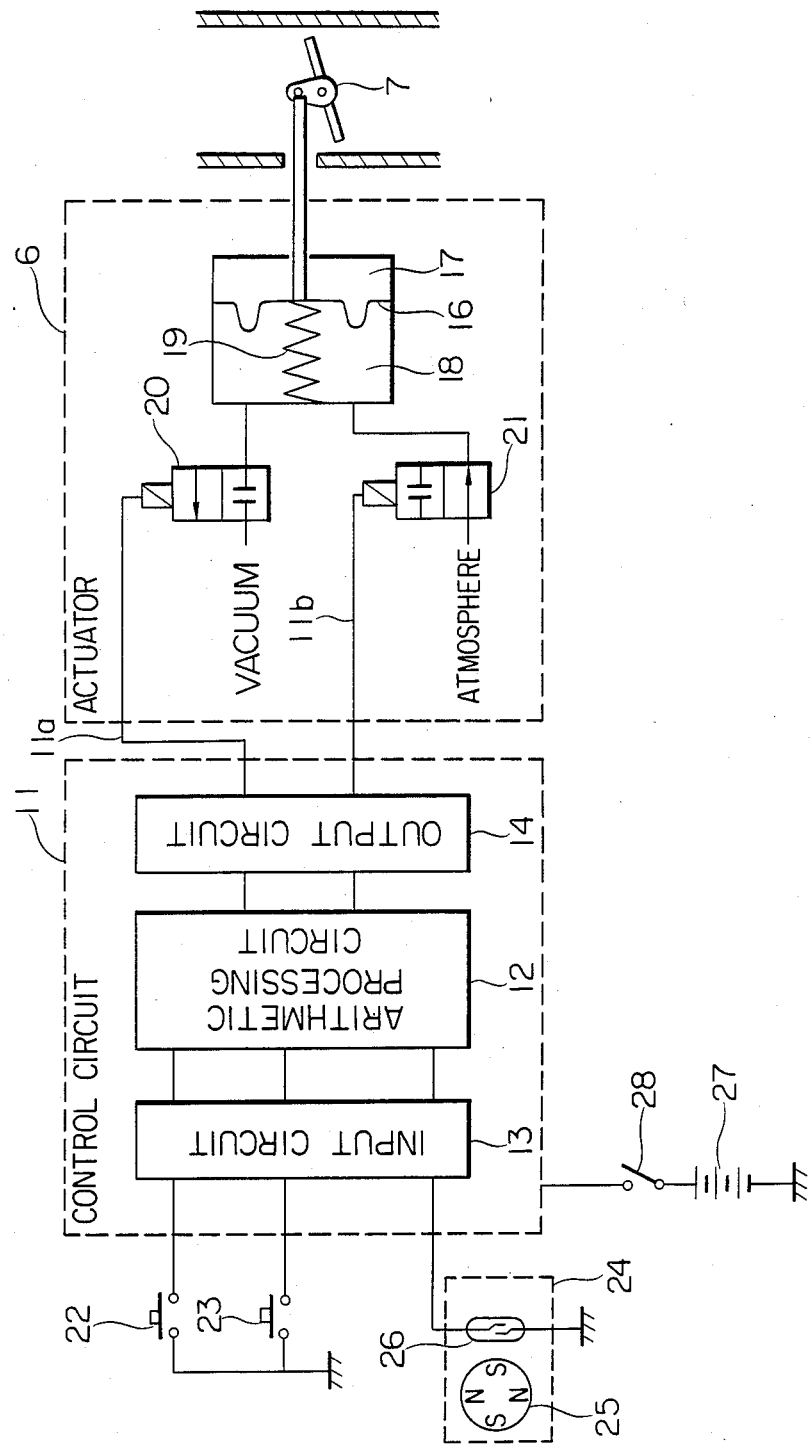
FIG. 2 shows a hardware arrangement of an automobile speed control system in accordance with the present invention.

In FIG. 2 showing a specific hardware arrangement which realizes the function of this invention illustrated in FIG. 1, a control circuit 11 is formed of an arithmetic processing circuit 12 such as a micro-computer, an input circuit 13 for sending an input signal to the arithmetic processing circuit 13, and an output circuit 14 responsive to the output signal of the arithmetic processing circuit 12 for actuating the actuator 6. The actuator 6 is formed of a diaphram 16, chambers 17 and 18, a spring 19, a vacuum valve 20, and an atmosphere valve 21. The chambers 17 and 18 are partitioned by the diaphram 16, and the chamber 17 is opened to the atmosphere. The chamber 18 is interconnected to a vacuum source (not shown) through the vacuum valve 20 and to the atmosphere through the atmosphere valve 21. The spring 19 serves to press the diaphram 16 to the right (as seen from the figure). The output circuit 14, in response to instruction signals received from the arithmetic processions circuit 12, serves to actuate the vacuum valve 20 and the atmosphere valve 21 in the actuator 6.

Specifically, the control circuit 11 provides as an output therefrom three types of signals to the actuator 6, an open mode, a closed mode, and a hold mode of operation signals.

In the open mode of operation, the vacuum valve 20 is opened while the atmosphere valve 21 is closed in response to the output signal from the output circuit 14. Therefore, since the chamber 18 is interconnected to the vacuum source through the vacuum valve 20, the diaphram 16 is moved to the left (as seen from the figure) to actuate the throttle valve 7 in its opening direction.

In the closed mode of operation, the vacuum valve 20 is closed while the atmosphere valve 21 is opened in response to the output signal of the output circuit 14. Therefore, since the chamber 18 is interconnected to the atmosphere through the atmosphere valve 21, the diaphram 16 is moved right to actuate the throttle valve in its closing direction.

In the hold mode of operation, both of the vacuum valve 20 and the atmosphere valve 21 are closed in response to the output signal from the output circuit 14. Namely, since the chamber 18 becomes sealed, the diaphram 16 and the throttle valve 7 are fixed, whereby the hold mode of operation is attained.

Furthermore, a setting switch 22 is provided to instruct the commencement of a constant speed running, and a cancelling switch 23 is provided to instruct the cancellation of the constant speed running. These switches 22 and 23 are adapted to be actuated by the operation of a brake pedal (not shown). A speed sensor 24 includes a rotary member 25 consisting of four magnetic poles which is rotated by a speed meter cable (not shown) and a reed switch 26, whereby four output pulses are generated per one rotation. A regular automobile-use battery 27 is connected through a main (power source) switch 28 to the control circuit 11.

FIGS. 3 and 4 show flow charts for explaining the operation of the control circuit 11 in which FIG. 3 shows three interrupt processings and FIG. 4 shows a main processing.

Figure 3A:
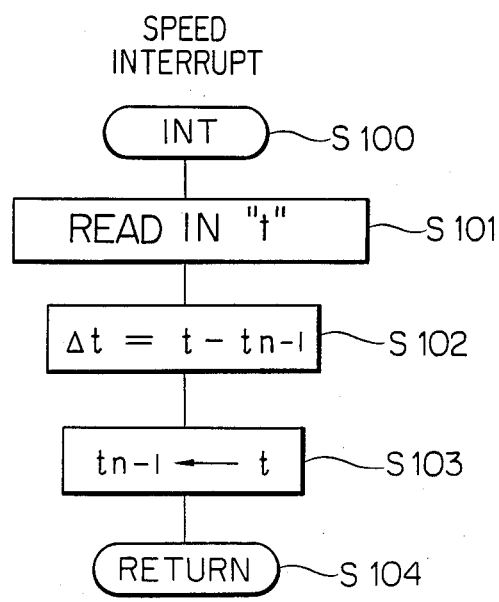

Particularly, FIG. 3A shows a flow chart for a speed interrupt processing in which the period of time of the output pulse of the speed sensor 24 is measured to calculate the speed of an automobile at step S132 in the flow chart of FIG. 4. First of all, an interrupt processing is initiated at step S100 by the output pulse of the speed sensor 24, and the current time point "t" is read in a memory (not shown) in the control circuit 11 at step 101. Then at step S102, a time difference $\Delta t$ between the time point "t" and the last interrupt point "$t_{n-1}$" is calculated and stored in the memory. Then at step S103, the time point "t" is stored as the time point "$t_{n-1}$" for the next interrupt, after which the program returns at step S104.

Figure 3B:
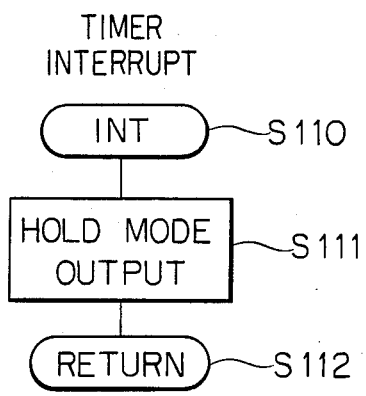

FIG. 3B shows a flow chart for a timer interrupt processing in which the mode of operation of the actuator 6 is changed. It is to be noted that FIG. 5 shows a time chart illustrating the manner how the mode of operation of the actuator 6 is changed. In FIG. 5, waveform (I) indicates an output signal developed by the control circuit 11 (i.e. appearing on line 11a in FIG. 2) in the open mode of operation of the actuator 6, waveform (II) indicates an output signal developed by the control circuit 11 (i.e. appearing on line 11b in FIG. 2) in the closed mode of operation of the actuator 6, and waveform (III) indicates the opening degree of the throttle valve 7. Correction of the opening of the throttle valve 7 by the actuator 6 is carried out at every predetermined (sampling) time interval (Ts), and the correction magnitude corresponds to a correction time interval (Tc), as shown in FIG. 5. After the completion of the correction, the opening of the throttle valve 7 is held at a fixed position by the output of the control circuit 11, indicating the hold mode of operation of the actuator 6 whereby the vehicle is controlled to run at a constant speed. The processing of the timer interrupt shown in FIG. 3B is started by the timer interrupt at step S110 which is executed after the correction time interval (Tc) has lapsed. Then at step S111, the mode of operation of the actuator 6 is rendered to be the hold mode, after which the program returns at step S112. Namely, during each time interval (Ts−Tc) the actuator 6 and therefore the throttle valve 7 are in the hold mode of operation by step S111.

Figure 3C:
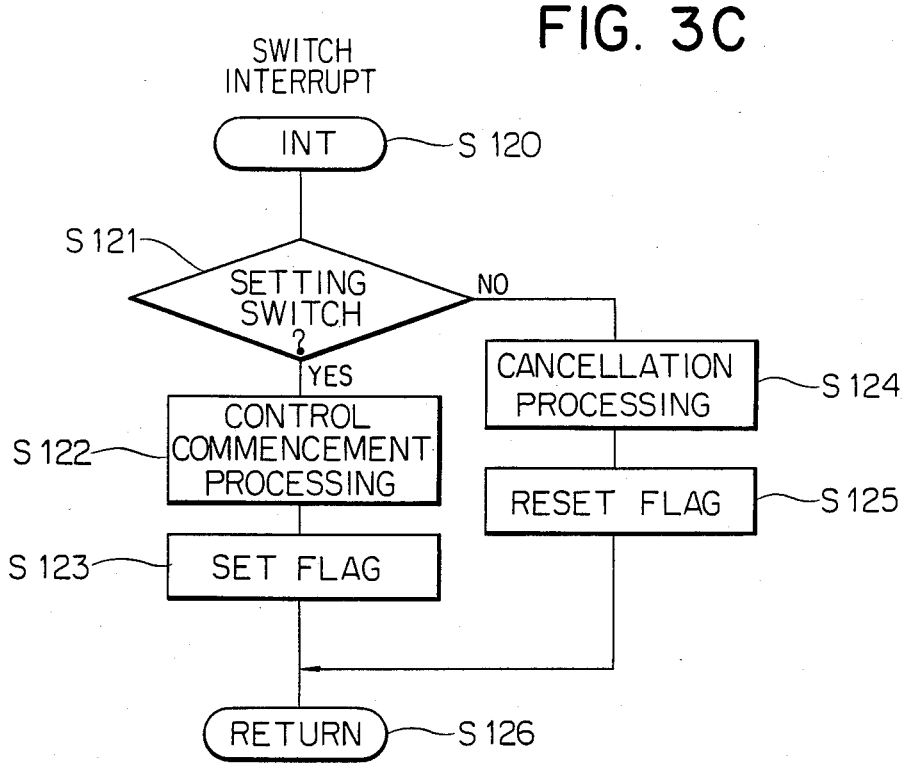

A switch interrupt processing shown in FIG. 3C is initiated by the actuation of the setting switch 22 and the cancelling switch 23, whereby the processing of the operation (commencement) or non-operation (cancellation) of the constant speed running system is executed. This routine is started at step S120, and which of the switches 22 and 23 is actuated is determined at step S121. In the case of the actuation of the setting switch 22, the program proceeds to step S122 while in the case of the actuation of the cancelling switch 23, the program proceeds to step S124. At step S122, the current running speed is read in and stored as a target speed in the memory, and a control commencement processing for the constant running such as an actuation processing for the actuator 6 is executed. Then at step S123, a FLAG is set to indicate that the control is being executed. On the other hand, at step S124, a cancellation processing such as for fully closing the throttle valve 7 by the actuator 6 is executed. This cancellation processing is carried out by the continuation of the closed mode of operation. Then at step S125, the FLAG is reset, after which the program returns at step S126.

The main flow chart shown in FIG. 4 will now be described.

Upon the closure of the main power switch 28, the arithmetic processing circuit 12 is energized by a power-on reset circuit (not shown) or the like, thereby starting this routine from step S130. Firstly, at step S131, an initializing process is executed. By this initializing process, the memory (not shown) included in the arithmetic processing circuit 12 is initialized, and the output ports are initialized. It is to be noted that the above noted interrupt processings shown in FIGS. 3A–3C are inhibited until this initialization is completed.

Then at step S132, the current running speed V of the automobile is calculated from the time period ($\Delta t$) of the output pulse of the speed sensor 24 with respect to the last output pulse which is stored by the speed interrupt processing shown in FIG. 3A. It is to be noted that steps S132–S139 are formed in a sampling loop which the program circulates every predetermined time interval Ts which is controlled by step S139 for checking whether or not the time interval Ts has lapsed.

Then at step S133, the acceleration $\alpha$ of the automobile is calculated. Since this main routine shown in FIG. 4 carries out a sampling operation every predetermined time interval Ts as above mentioned, the acceleration $\alpha$ is determined by the following equation:

$$\alpha = (V - V_{n-1})/Ts$$

where $V_{n-1}$ designates the running speed at the last sampling time.

Then at step S134, the rate of change of the acceleration of the automobile is determined by the following equation:

$$\beta = (\alpha - \alpha_{n-1})/Ts$$

where $\alpha_{n-1}$ designates the acceleration of the last sampling time.

Next, at step S135, a speed deviation $\epsilon$ is determined as in the following equation:

$$\epsilon = V - Vo$$

where: V designates the current running speed calculated at step S132; and Vo designates the target speed stored at step S122 during the execution of the switch interrupt processing shown in FIG. 3C.

Then at step S136, the actuation time interval of the actuator 6 which corresponds to the correction magnitude Tc is determined by the following equations:

$$Tc = K1\epsilon + K2\alpha \text{ (when the signs of } \alpha \text{ and } \beta \text{ are same)}$$

$$Tc = K1\epsilon + K3\alpha \text{ (when the signs of } \alpha \text{ and } \beta \text{ are opposite)}$$

where K1, K2, and K3 are control proportional constants and K2>K3. These constants may be negative or positive numbers. Namely, according to the signs of the acceleration $\alpha$ and the acceleration change rate $\beta$ obtained at steps S133 and S134, either one of the above two equations concerning Tc is selected to adjust the control parameters K2, K3 associated with the acceleration, in this embodiment.

It is to be noted that when the calculated result of Tc is positive, the actuator 6 is actuated in the closed mode of operation as shown by the waveform (II) in FIG. 5 while when it is negative, the actuator 6 is actuated in the open mode of operation as shown by the waveform (I) in FIG. 5. For example, when the acceleration $\alpha$ of the automobile is positive and the change rate $\beta$ of the acceleration is also positive, the correction magnitude Tc is set greater than that provided when the acceleration $\alpha$ is positive and the change rate $\beta$ of the acceleration is negative. Therefore, in the case where the driving force of the automobile is greatly insufficient or excessive as compared to the running resistance of the automobile as in an abrupt ascending road, the acceleration $\alpha$ and the acceleration change rate $\beta$ have the same sign, so that the speed deviation is immediately corrected by increasing the correction magnitude Tc. In other words, since the acceleration change rate $\beta$ leads the acceleration $\alpha$ by 90° in phase, a quickly responsive correction is achieved.

Then at step S137, whether or not the FLAG is set is determined, wherein if the FLAG is not set, implying that the automobile is running at the constant speed, the program proceeds to step S124 while otherwise the program proceeds to step S138 where the mode of operation for the actuator 6 is determined on the basis of the correction magnitude Tc calculated at step S136, whereby the output circuit 14 actually provides the corresponding output and the timer value i.e. the time interval Tc is set for the timer interrupt processing shown in FIG. 3B. At step S124, the cancellation processing is executed so as to cause the actuator 6 to be actuated in the closed mode or deceleration mode of operation where the automobile is decelerated as mentioned above. At step S139 as described above, it is determined whether or not the predetermined time interval Ts has lapsed, in which if lapsed, the program returns to step S132 while if not lapsed, this step is repeated until the time interval Ts has lapsed.

It is to be noted that while in the above embodiment the control parameter of the acceleration $\alpha$ are adjusted at two stages (K2, K3) by judging the signs of the acceleration $\alpha$ and the acceleration change rate $\beta$, the control parameter of the acceleration $\alpha$ may be adjusted at multi-stages corresponding to the magnitude of the acceleration change rate $\beta$ instead of the signs, or may be adjusted in an analog form as being a function of the acceleration change rate $\beta$. Moreover, it is needless to say that the adjustment for the control parameter of the speed deviation $\epsilon$ by the acceleration $\alpha$ and the acceleration change rate $\beta$ would also improve the responsiveness of the speed control apparatus.

As set forth in the above, according to the present invention, a correction operation for the opening of the throttle valve every predetermined time interval Ts is carried out, and the correction magnitude is determined by the speed deviation $\epsilon$ and the acceleration $\alpha$ and the control parameter of the pulse width calculating means is adjusted by using the acceleration $\alpha$ and the acceleration change rate $\beta$ which leads the acceleration $\alpha$ in phase. Accordingly, even though a large speed deviation is generated, the opening of the throttle valve is immediately corrected to an adequate degree, so that even in a road which is alternatively ascending and descending, the automobile speed control system according to this invention has only a small deviation and a comfortable ride is provided.

It is to be noted that while the present invention has been described with reference to the above embodiments illustrated in the accompanying drawings, it should not be limited to them and may be applied with various modifications thereof without departing from the spirit of the invention.

What I claim:

1. An automobile speed control system comprising:
   a running speed measuring means (1) for measuring the running speed of said automobile;
   a speed setting means (2) for setting a desired speed;
   a speed deviation calculating means (3) for receiving the set speed signal from said speed setting means and the running speed signal from said speed measuring means to calculate a speed deviation;
   an acceleration calculating means (4) for calculating the acceleration of said automobile in response to the running speed signal from said speed measuring means;
   a pulse width calculating means (5) for calculating the pulse width of a pulse signal having a fixed period of time on the basis of the speed deviation signal from said speed deviation calculating means and the acceleration signal from said acceleration calculating means;
   an actuator (6) for receiving the pulse signal from said pulse width calculating means to control the opening of a throttle valve (7) of an engine according to the pulse width of said pulse signal;
   an acceleration change rate calculating means (8) for receiving an acceleration signal from said acceleration calculating means to calculate the rate of change of the acceleration of said automobile; and
   a control parameter adjusting means (9) for receiving the acceleration signal from said acceleration calculating means and the acceleration change rate signal from said acceleration change rate calculating means to adjust the control parameter of said pulse width calculating means.

2. An automobile speed control system as claimed in claim 1, wherein said actuator comprises a diaphram (16) for actuating said throttle valve, and first and second chambers (17,18) partitioned by said diaphram, said first chamber being directly interconnected to the atmosphere, said second chamber being interconnected to a vacuum source through a vacuum valve (20) and to the atmosphere through an atmosphere valve (21).

3. An automobile speed control system as claimed in claim 2, wherein said pulse width calculating means includes means for closing said vacuum valve when a calculated result of said pulse width is positive, whereby said atmosphere valve is opened to move said diaphram to close said throttle valve, and means for opening said vacuum valve when a calculated result of said pulse width is negative, whereby said atmosphere valve is closed to move said diaphram to open said throttle valve.

4. An automobile speed control system as claimed in claim 1, wherein said control parameter adjusting means comprises means for selecting either one of the calculated pulse widths depending on whether the signs of said acceleration and said acceleration change rate are the same or opposite, the calculated pulse width obtained in the case of the same signs being larger than that obtained in the case of the opposite signs.

5. An automobile speed control system as claimed in claim 4, wherein said pulse width calculating means further includes means for calculating said pulse width by $K1\epsilon + K2\alpha$ where $K1$ and $K2$ are control parameters, and designates said speed deviation and $\alpha$ designates said acceleration.

6. An automobile speed control system as claimed in claim 1, further comprising means for generating a sampling time interval for the constant speed control.

7. An automobile speed control system as claimed in claim 6, further comprising means for holding said actuator and said throttle valve at their current positions for said sampling time interval except for the time interval of said calculated pulse width.

8. An automobile speed control system as claimed in claim 1, wherein said speed setting means comprises means (22, 23) for commencing and cancelling said constant speed control.

* * * * *